Jan. 4, 1927.
W. GOODE
1,613,164
CUT-OFF VALVE
Filed April 1, 1926
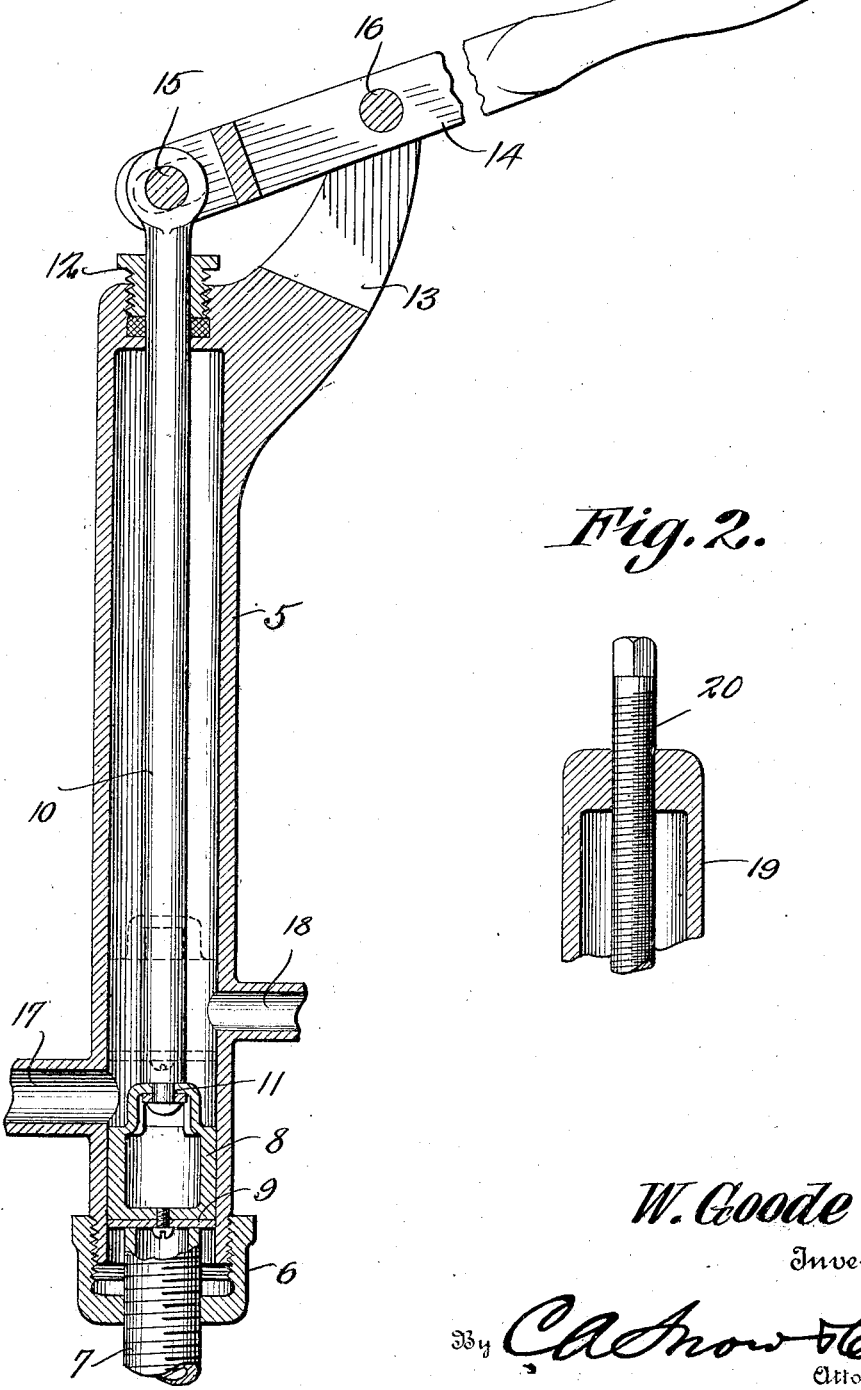
W. Goode
Inventor,
By C. A. Snow & Co.
Attorneys.

Patented Jan. 4, 1927.

1,613,164

UNITED STATES PATENT OFFICE.

WILLIAM GOODE, OF KNOXVILLE, TENNESSEE.

CUT-OFF VALVE.

Application filed April 1, 1926. Serial No. 99,127.

This invention has reference to cut-off valves and aims to provide novel means wherein water passing from a main pipe line may be controlled efficiently, and one wherein the valve will not stick when the valve has not been operated for a great length of time.

Another object of the invention is to provide a valve casing wherein water may drain therefrom after the valve member has been shut off.

A still further object of the invention is to provide a valve of this type which may be efficient in operation and cheap in construction, and one which may be operated with the minimum amount of effort on the part of the person attending the valve.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through a valve and valve casing constructed in accordance with the invention.

Figure 2 is a modified form of the invention, the same being shown in section.

Referring to the drawing in detail, the reference character 5 indicates the valve housing which is elongated and is provided with a threaded lower extremity adapted to accommodate the threaded cap 6, which is formed with an opening to receive the threaded extremity 7 of a feed pipe.

The valve member is indicated by the reference character 8 and is supplied with a valve disk 9 at its lower end adapted to engage the upper end of the pipe 7 to cut off the passage of fluid through the pipe and valve housing 5.

The reference character 10 indicates a valve rod which has its lower end swiveled to the valve member 8 as at 11, the upper end of the rod 10 extending through the upper end of the valve housing 5, where it is supplied with a suitable packing gland 12 for insuring a fluid-tight connection between the rod 10 and upper portion of the housing 5.

Formed integral with the valve housing 5 and extending laterally and upwardly therefrom are the arms 13 between which the lever 14 is pivotally mounted, the forward end of the lever 14 being supplied with an elongated opening to accommodate the pin 15 that connects the rod 10 and lever 14 so that as the lever 14 is moved on its pivot which is indicated at 16, the valve rod 10 will be moved correspondingly.

The outlet pipe is indicated at 17 while the drain pipe is indicated at 18 and it will be seen that when the valve member 8 is moved upwardly to a position as shown in dotted lines in Figure 1, water may flow upwardly through pipe 7 and outwardly through pipe 17, and any fluid above the valve 8 may drain from the housing 5 through pipe 18.

In the modified form of the invention as shown by Figure 2, the valve housing which is indicated at 19 is formed with a threaded upper extremity to cooperate with the threaded valve stem 20 to the end that in place of a pivotal movement for controlling the rod to which the valve is connected, a rotary movement of the valve rod will operate to move the valve from its closed position or to its open position or vice versa.

I claim:

In a valve of the class described, an elongated valve housing, a feed pipe extending into the lower end of the valve housing, an outlet pipe communicating with the housing and extending laterally therefrom, a drain pipe communicating with the housing and disposed above the outlet pipe, a valve member of a diameter to engage the wall of the housing throughout the length of the housing, said valve member adapted to move to cause the end thereof to engage the inlet pipe to control the passage of fluid therethrough, said valve adapted to be moved so that the sides thereof will move opposite the outlet and drain pipes to control the passage of fluid through the outlet and drain pipes, and means for operating the valve.

In testimony that I claim the foregoing as my own, I have hereto affixed my signature.

WILLIAM GOODE.